Nov. 3, 1936.  W. E. BROOME  2,059,548
GRAVITY SAND AND GRAVEL SPREADER
Filed Dec. 26, 1933   2 Sheets-Sheet 1

Inventor.
Woody E. Broome
by R. M. Thomas
Attorney

Nov. 3, 1936.     W. E. BROOME     2,059,548
GRAVITY SAND AND GRAVEL SPREADER
Filed Dec. 26, 1933     2 Sheets-Sheet 2

Inventor.
Woody E. Broome
by R. M. Thomas
Attorney

Patented Nov. 3, 1936

2,059,548

UNITED STATES PATENT OFFICE 2,059,548

GRAVITY SAND AND GRAVEL SPREADER

Woody E. Broome, Myton, Utah

Application December 26, 1933, Serial No. 703,947

4 Claims. (Cl. 275—14)

My invention relates to gravel and sand distribution and has for its object to provide a new and efficient device for spreading gravel or sand onto road surfaces.

A further object is to provide a gravel spreader which may be attached to the rear end of a dump truck and which will distribute the gravel from the rear end of the truck as the truck is being driven forward or backward up the road, the spreader to distribute the gravel entirely over the surface of the road desired, in an even layer of equal thickness as desired.

A still further object is to provide a gravel spreader to distribute sand or gravel onto newly oiled road surfaces in an even layer with all of the surface desired covered by the same amount of gravel.

A still further object is to provide a device for spreading already mixed or commonly called plant mixed gravel and oil combination.

These objects I accomplish with the device illustrated in the accompanying drawings in which similar numerals and letters of reference indicate like parts throughout the several views and as described in the specification forming a part of this application and pointed out in the appended claims.

In the drawings in which I have shown the device

Figure 1:
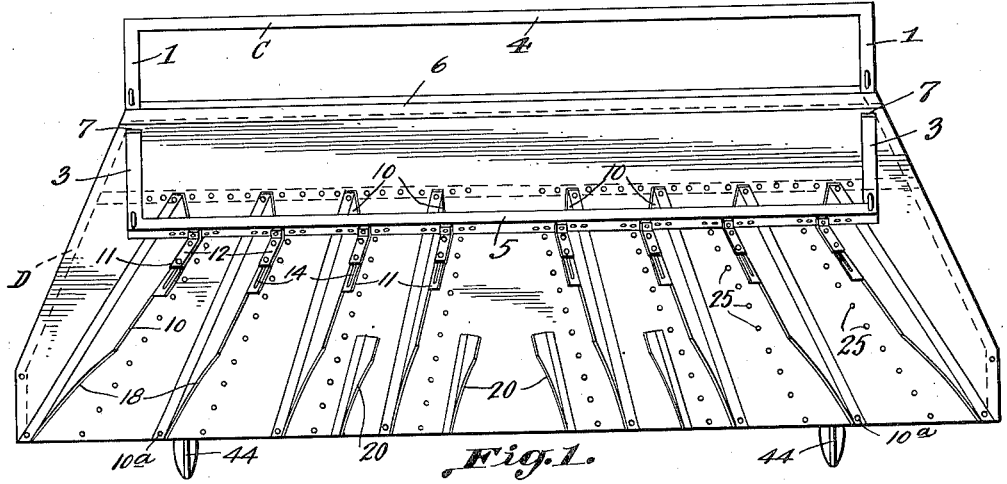
Figure 1 is a plan view of the device.

In the drawings the device is shown as a detachable device for removing from one truck and placing it on the next loaded truck that arrives at the distributing point. Thus, one device may be used on several trucks to spread the gravel, the spreader being detached when one truck is empty and attached to the next full truck arriving at that point of the road.

In some cases the devices may be attached permanently to the truck body and each truck equipped with the spreader. This may be done by slight modifications of the modes of attaching the device, which are shown in the drawings, but such modifications and changes are thought to be within the spirit of the invention and within the scope of the claims.

In the different makes and models of trucks used for road work, which come within the dump truck class, there are differences in their construction and therefore modifications will be necessary in the methods of attaching or supporting the spreader thereto and these modifications are also thought to be within the spirit of the invention and scope of the claims.

In the drawings the truck dump body is shown as A with just the rear end shown, that part being the only part thought to be pertinent to the invention. To this rear end I then attach my spreader. The spreader consists of a flat apron or plate B with the outer edge wider than the truck engaging edge, and having a frame work D of angle iron to reinforce the plate. A suspending frame work C is also made of angle iron, or other suitable metal frame work is provided the frame work being rectangular in form with the ends bent with one portion 1 to rest against the bottom side of the truck body A and then with a depending slanting section 2 to space the angled portion 3 from the bottom of the truck and allow for opening of the end gate of the truck.

Figure 6:
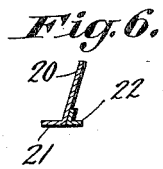
Figure 6 is a section on line 6—6 of Figure 5.

Each end is made alike and the end portions 1 are joined by a cross piece 4 and the end angled portions 3 are joined by a portion 5 to form the entire device. The plate B is attached to the frame work by a flange 6 being secured thereonto and the portions 3 of the frame work pass out through openings 7 in the plate B. The plate B is then divided into separate channels by distributing or spreader vanes 10, the vanes 10 having the top side 11 thereof formed at an angle thereto and secured to an angle bracket 12 by bolts 13 passing through the bracket and through slots 14 in the vanes, the slots 14 being through the bent portion 11 and of sufficient length to allow for adjustment of the vanes. The portion 5 of the frame work C is provided with spaced apart holes for adjustment of the vanes across the face of the plate B. The engaging side of the vanes 10 is formed with an angle 15 which is attached to the body of plate B by suitable rivets or bolts 10a at each end thereof. A reinforcing strip may be laid over the angle 15 if necessary to reinforce the angle and body of the vane. The back side of the vanes is reinforced by an angle iron 17 being secured to the vane with one leg resting on plate B. Each of the vanes is cut away in a semicircular segment at 18 to allow for passing of some of the gravel over the extreme end thereof for a more complete distribution thereof. The upper end of the vane is secured to a cross brace of the plate B and is adjustable so that the vane may be tilted in either direction as desired for better distribution of the gravel. Short spreader blades 20 are provided to be secured to the plate B between the vanes 10 if desired or wherever necessary. These blades are made with a flat face and with an angle 21 formed on the bottom side to rest on the plate B and each blade is reinforced on the opposite side by an angle iron 22 as shown in Figure 6. Each of the blades is provided with a cut away section 23 near the end thereof to allow for gravel to pass over that portion of the blade similar to the manner of the vanes 10.

Between the vanes 10 I provide spreader pins 25 made with the upper end extending up through the plate B to intercept the gravel and divert it into each side thereof to more completely distribute the gravel over a given area.

Figures 2, 3, 4:
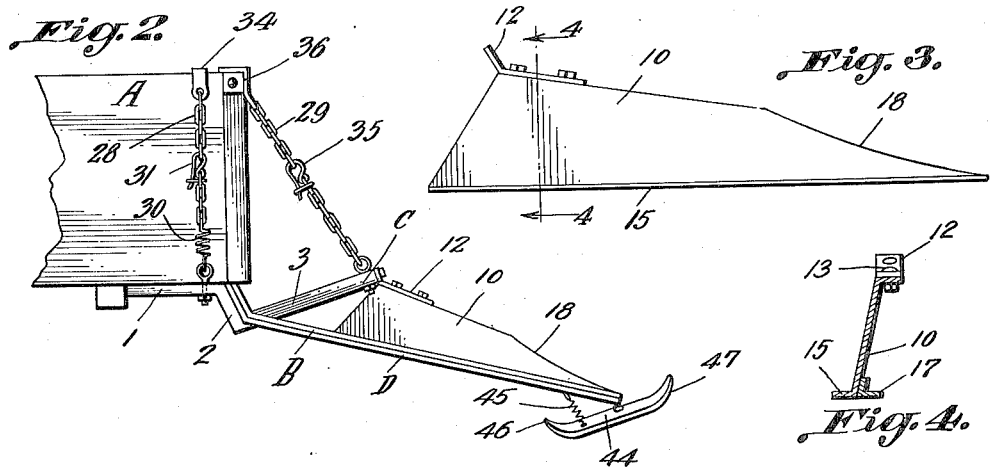
Figure 2 is an end elevation of the device detachably mounted to the rear end of a dump truck body.
Figure 3 is a side elevation of one of the spreader vanes.
Figure 4 is a section on line 4—4 of Figure 3.
Figure 5:
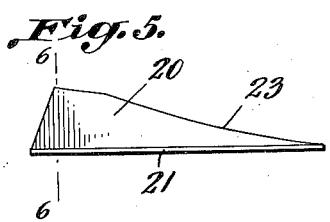
Figure 5 is a side elevation of one of the short spreader blades or vanes used.
Figure 7:
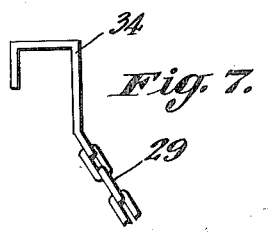
Figure 7 is a side elevation of one of the hooks used to attach the support chains to the truck body.
Figure 8:
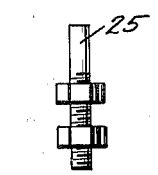
Figure 8 is a view of one of the gravel spreader pins used in the device.
Figure 9:
Figure 9 is a side elevation of a short side control blade used to prevent spreading beyond the end of the bottom plate when desired.

The portion 1 of the frame work C is inserted under the back end of the body of the truck and the device is then supported by chains 28 and 29. The chain 28 is secured to the end of the frame work adjacent the bent portion 2 and the chain may carry a spring 30 therein if desired as shown in Figure 2. The chain is made in two sections and the lower section is provided with a hook link 31 to facilitate the securing of the device to the truck body and insure that it is held securely thereto. The top of the chain is secured to the truck body by a U-shaped bracket 34 as shown in Figure 2 and shown alone in Figure 7. The top end of the chain 29 is secured to the end gate of the truck by a like bracket 36 and this chain is joined by a locking toggle link 35. To prevent the rear edge of the plate from engaging the surface of the road, should the truck on which the device is used be of low wheel type, I have provided the skid runners 44 which are pivotally attached to the edge of the plate B and which have the rear end secured to the plate by a spring 45. The ends 46 and 47 are turned up to prevent the runner from digging into the road surface.

Figure 10:
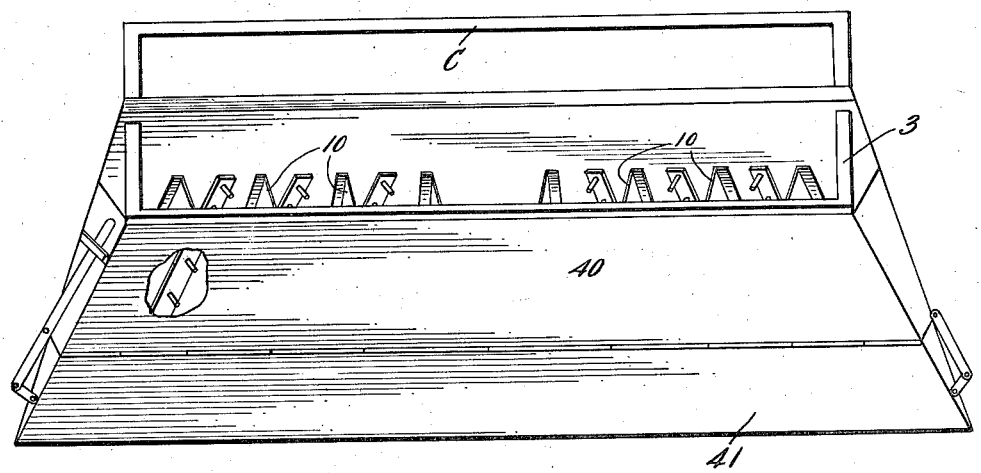
Figure 10 is a face view of a modified form of spreader where a closed hopper is used to distribute the gravel with the end adapted to be closed by a pivot gate.
Figure 11:
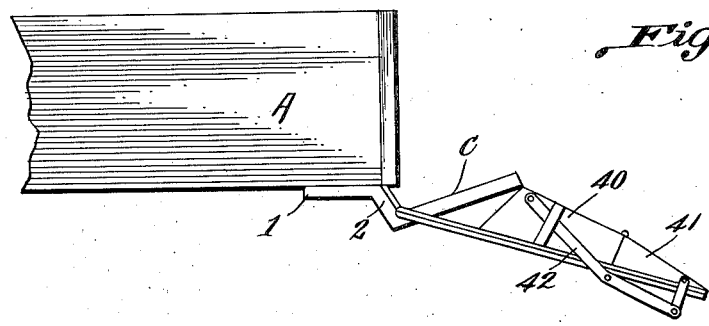
Figure 11 is an end view of the modified form attached to a truck.
Figure 12:
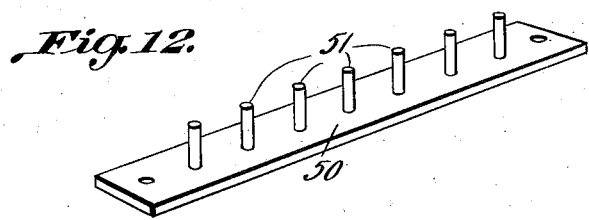
Figure 12 is a perspective view of a method of mounting the spreader pins on a single blade and thereby facilitating movement and adjustment of the blades by simply moving the bolt at either end thereof.

In the type of device shown in Figures 10 and 11, the entire outer face of the device is enclosed by a sheet of metal 40 bent to conform to the shape of the blades and vanes and secured to the plate B at each end and to the section 4 of the frame work C. The bottom of the sheet 40 is provided with a hinged gate 41 adapted to be actuated by the lever 42 to open the end of the casing and allow the gravel to flow therefrom. This provides a hopper type of distributing means to control the flow of materials as desired. This may be controlled by the operator or may be controlled by the driver of the truck.

The pins used to spread the gravel may be made adjustable without the trouble of removing each separate pin and again inserting it through the plate B, by making separate elements consisting of a bar 50 having each end perforated through which securing bolts may be passed to secure the bar to the plate B and the bars are then provided with spaced apart spreader pins protruding from the top of the plate. These pins may then be set onto the plate B and the angle of the bar 50 varied as desired for adjustment of the pins to provide the best spreading action and position of the pins.

The operation of the invention is as follows:

When attached to the truck the device is ready for use and may be used with the truck backed up or driven forward.

When backing up to use the device over already oiled roads to spread the gravel thereon before the truck wheels strike the gravel the driver starts to back at the same time elevating his truck body with the end gate released. The gravel then flows from under the end gate onto the plate B where it is spread and distributed by the vanes 10, the blades 20 and the pins 25. Thus when the truck has passed over a given territory, the entire load is spread evenly onto the road. The operation of the spreader is identical no matter how it is used or whether the truck is driven forward or backward.

Having thus described my invention I desire to secure by Letters Patent and claim:

1. In a device for spreading gravel from dump trucks, the combination of a plate having one end adapted to fit onto the rear end of the dump truck and with the opposite edge of said plate wider to spread the gravel a greater width than the width of the truck body; means to support said plate from said truck body; spreader vanes secured to said plate with the upper ends of the vanes secured to the plate near the truck body and the lower ends diverging and secured to the wider edge of said plate; and spreader pins secured to said plate between said vanes to aid in distributing the gravel.

2. In a device for spreading gravel from dump trucks, the combination of a plate having one edge engaging the truck body and the opposite edge wider to spread the gravel farther than the width of the truck; long and short spreader blades carried on said plate adjustably secured thereto with the extreme ends of the blades which are secured to the wider edge of the plate cut away in a curve to allow some of the gravel to pass thereover and with the upper ends of the said blades secured to the place near where the plate is supported from the truck body; and means to support said plate from said truck.

3. In a device for spreading gravel from dump trucks, the combination of a plate to fit the end of the truck; spreader blades secured to said plate; spreader pins secured to said plate between said vanes; a covering for said vanes and plate to provide a closed hopper thereover; and a pivoted plate on the bottom edge of the covering to open the hopper for distribution of the gravel.

4. In a device for spreading gravel from dump trucks, the combination of a plate having one edge engaging the truck body and the opposite edge made wider to spread the gravel farther on each side than the width of the truck body; long and short spreader blades secured to said plate with the lower end of the blades secured to the wider edge of said plate and cut away in a curve to allow some of the gravel to pass thereover and the upper end of the blades secured to the plate near where it is supported from the truck body; spreader pins secured to said plate between said blades to further separate and distribute the gravel passing out over the upper face of said plate; and means to support the plate from the truck body.

WOODY E. BROOME.